(No Model.)

J. THOMAS.
CUT-OFF MECHANISM.

No. 272,797. Patented Feb. 20, 1883.

WITNESSES:
Francis McArdle.
C. Sedgwick.

INVENTOR:
J. Thomas
BY Munn & Co.
ATTORNEYS.

N. PETERS, Photo-Lithographer, Washington, D. C.

UNITED STATES PATENT OFFICE.

JAMES THOMAS, OF CATASAUQUA, PENNSYLVANIA.

CUT-OFF MECHANISM.

SPECIFICATION forming part of Letters Patent No. 272,797, dated February 20, 1883.

Application filed November 20, 1882. (No model.)

*To all whom it may concern:*

Be it known that I, JAMES THOMAS, of Catasauqua, in the county of Lehigh and State of Pennsylvania, have invented a new and Improved Cut-Off Mechanism for Steam-Engines, of which the following is a full, clear, and exact description.

The object of my invention is to combine simple and inexpensive cut-off gearing with an ordinary slide-valve for governing the amount of steam admitted to the engine-cylinder.

My invention consists in a cylindrical valve combined with a slide-valve, so as to be operated by a governor to regulate the amount of steam passing through the slide-valve to the engine, as hereinafter described and claimed.

Reference is to be had to the accompanying drawings, forming a part of this specification, in which similar letters of reference indicate corresponding parts in all the figures.

Figure 1:
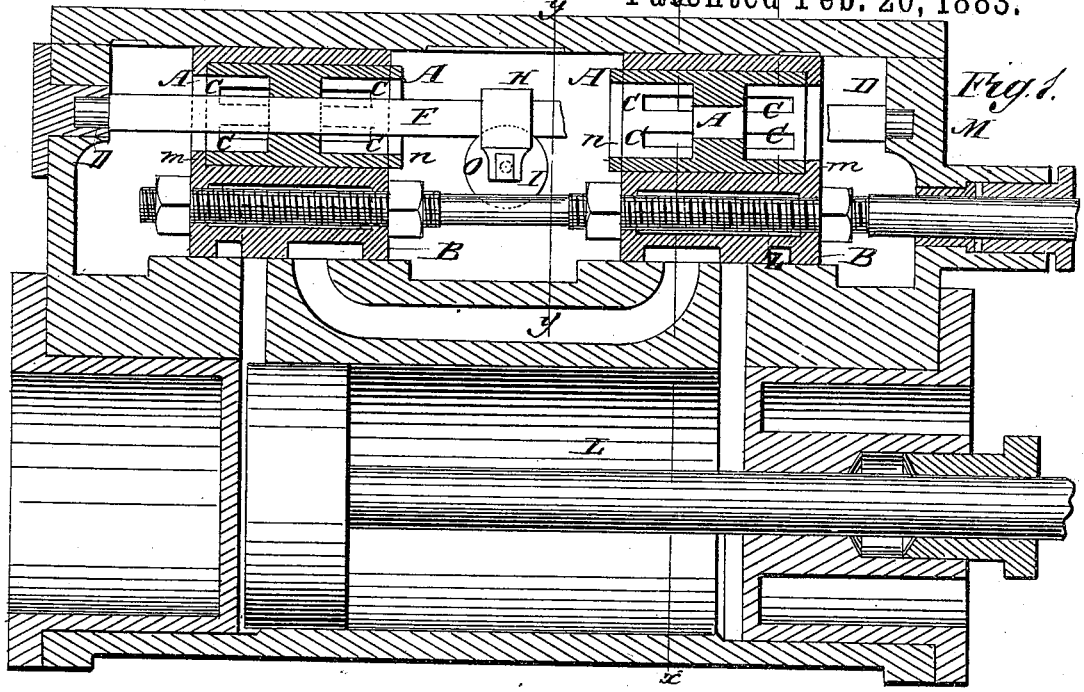
Figure 2:
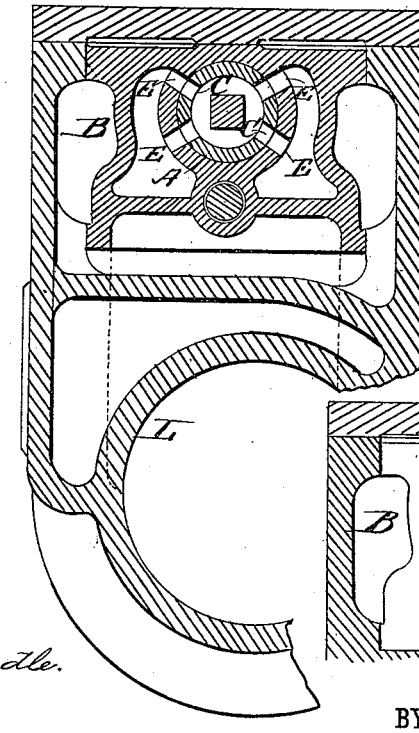
Figure 3:
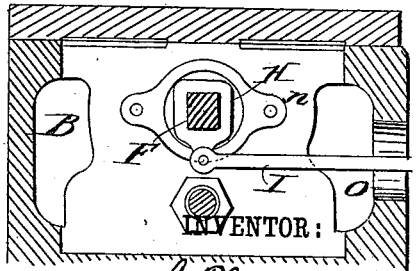

Figure 1 is a longitudinal section of an engine-cylinder and steam-chest provided with my improved valve mechanism. Fig. 2 is a cross-section on the line $x\,x$. Fig. 3 is a cross-section on the line $y\,y$, Fig. 1; and Fig. 4 is a cross-section of the valves on line $z\,z$, Fig. 1.

The cylinder L and steam-chest M may be of any ordinary or desired construction.

Figure 4:
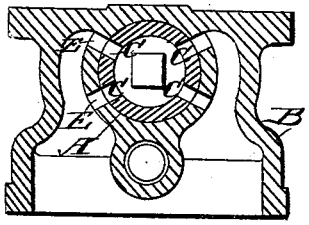

B B are the slide-valves, fitted upon the one valve-rod, and A A are the cut-off valves that are combined with the slide-valves, as shown most clearly in Figs. 2 and 4. Each slide-valve B is formed hollow to give space for the passage of the steam, there being a middle partition that separates the live from the exhaust steam passages. The valve is also formed with a cylindrical seat for the valve A, which is also of cylindrical form and hollowed out or recessed at its ends.

In the sides of the valve A, and also in the seat, are steam-ports C C and E E, which, when brought in register, allow passage of the steam from the steam-chest to the interior of the valve B. The two valves A A are loose upon a square stem or rod, F, which is supported at its ends by bearings D in the ends of the steam-chest.

The valves A are kept in place by lips $m$ and rings $n$ upon the valves B, so that the cut-offs shall move with the slide-valves, but are free to rotate in their seats with the stem, which is also free to rotate in its bearings, but has no endwise movement. At its mid-length is a sleeve, H, to which is attached a rod, I, that passes out through the steam-inlet of the chest directly to the governor.

In operation any variation of the speed of the engine is communicated by the governor, through the rod I, to the stem F and cut-off valves A, which, being thus rocked, open and close the slots C and E more or less, thus admitting or cutting off the supply of steam.

I do not limit myself to the especial construction and arrangement of the parts as shown, as they may be varied within the scope of my invention.

Having thus fully described my invention, I claim as new and desire to secure by Letters Patent—

The combination, with a hollow slide-valve having the lips $m$ and rings $n$, and the squared rocking shaft F, of the hollow rocking cut-off valve A, divided transversely and open at the ends, the two valves being provided with registering ports C E, as shown, whereby the cut-off valve may carry the slide-valve on the stem F and be rocked within it by the stem, as described.

JAMES THOMAS.

Witnesses:
  GEO. W. BOWER, Jr.,
  J. H. FRAUNCES.